(12) United States Patent
Huber et al.

(10) Patent No.: US 11,498,238 B2
(45) Date of Patent: Nov. 15, 2022

(54) GARDENING AND/OR FORESTRY APPARATUS

(71) Applicant: Andreas Stihl AG & Co. KG, Waiblingen (DE)

(72) Inventors: Bernhard Huber, Oppenweiler (DE); Georg Heinzelmann, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 46 days.

(21) Appl. No.: 16/269,116

(22) Filed: Feb. 6, 2019

(65) Prior Publication Data

US 2019/0240859 A1    Aug. 8, 2019

(30) Foreign Application Priority Data

Feb. 6, 2018 (EP) ..................... 18155346

(51) Int. Cl.
*B27B 17/00* (2006.01)
*B27B 17/08* (2006.01)
*B25F 5/02* (2006.01)
*A01G 3/08* (2006.01)

(52) U.S. Cl.
CPC .......... *B27B 17/0008* (2013.01); *A01G 3/086* (2013.01); *B25F 5/02* (2013.01); *B27B 17/083* (2013.01)

(58) Field of Classification Search
CPC .......... B25F 5/00; B25F 5/02; B27B 17/0008; B27B 17/083; B25C 7/00; A01G 3/086; B25H 3/006; F16B 45/00; F16B 45/02; F16B 45/06; G01B 3/10

USPC ........ 30/381, 298.4, 275.4, 296.1, 514, 517; 224/232, 268, 269, 904
See application file for complete search history.

(56) References Cited

U.S. PATENT DOCUMENTS 2,839,831 A * 6/1958 Baer .................... A45F 5/02
                                                  30/298.4
3,371,951 A * 3/1968 Bryant .................. B66C 1/66
                                                  294/82.1
(Continued)

FOREIGN PATENT DOCUMENTS

CN    101314220 A    12/2008
CN    102017871 A    4/2011
(Continued)

OTHER PUBLICATIONS

Cover page of EP 2 293 907 A1 published Mar. 16, 2011 (one (1) page).
(Continued)

*Primary Examiner* — Laura M Lee
(74) *Attorney, Agent, or Firm* — Crowell & Moring LLP

(57) ABSTRACT

A gardening and/or forestry apparatus has a support element. The support element supports an eyelet. The eyelet is configured to incorporate an apparatus securing element. The gardening and/or forestry apparatus also has an element receiving device. The support element and the element receiving device are configured to receive the support element in the element receiving device either in a first rotational position or in a second rotational position differing from the first rotational position and to secure the support element against rotation by form-fitting to the element receiving device.

11 Claims, 8 Drawing Sheets

(56) References Cited

U.S. PATENT DOCUMENTS

| | | | | |
|---|---|---|---|---|
| 5,272,813 A * | 12/1993 | Wolf | .................. | B27B 17/0008 30/296.1 |
| 7,062,857 B1 * | 6/2006 | Nenadic | .................. | B26B 1/042 30/161 |
| 7,306,052 B2 * | 12/2007 | Vahabi-Nejad | ........... | B25C 7/00 173/216 |
| 7,318,487 B2 * | 1/2008 | Liao | .......................... | B25F 5/00 16/436 |
| 7,434,502 B2 * | 10/2008 | Keeton | ................... | B27B 17/14 30/386 |
| D660,120 S * | 5/2012 | Tajik | ................................ | D8/65 |
| 8,308,034 B2 | 11/2012 | Shibata et al. | | |
| 8,905,573 B2 * | 12/2014 | Sharrah | ................... | F21L 4/005 362/205 |
| 9,889,547 B2 * | 2/2018 | Marks | ........................ | B25C 7/00 |
| D855,431 S * | 8/2019 | Jablonski | ......................... | D8/70 |
| 2002/0122707 A1 * | 9/2002 | Sakai | .................... | B25B 23/045 408/241 R |
| 2002/0152618 A1 * | 10/2002 | Covell | ................ | B27B 17/0008 30/296.1 |
| 2004/0035596 A1 * | 2/2004 | Wattenbach | ........... | B23D 59/00 173/217 |
| 2005/0015935 A1 | 1/2005 | Bader et al. | | |
| 2006/0186152 A1 * | 8/2006 | Williams | ................... | A45F 5/02 224/269 |
| 2007/0277990 A1 | 12/2007 | Steinbrunner et al. | | |
| 2008/0156836 A1 * | 7/2008 | Wadsworth | ............. | A45F 5/021 224/269 |
| 2008/0295794 A1 | 12/2008 | Steinhauser | | |
| 2009/0078730 A1 * | 3/2009 | Kuny | ..................... | A45F 5/021 224/269 |
| 2009/0100688 A1 * | 4/2009 | Sugishita | ............ | B27B 17/0008 30/381 |
| 2009/0278012 A1 | 11/2009 | Okouchi et al. | | |
| 2011/0072671 A1 | 3/2011 | Tsuruoka | | |
| 2011/0289786 A1 | 12/2011 | Bijsterveldt et al. | | |
| 2012/0023761 A1 | 2/2012 | Martinsson et al. | | |
| 2012/0055034 A1 * | 3/2012 | Andersson | ............... | B25G 1/01 30/383 |
| 2014/0173917 A1 | 6/2014 | Van Bijsterveldt et al. | | |
| 2014/0190713 A1 * | 7/2014 | Martinsson | ............ | A01G 3/086 173/20 |
| 2014/0298664 A1 * | 10/2014 | Van Bijsterveldt | ....... | B25F 5/02 30/298.4 |
| 2019/0030380 A1 * | 1/2019 | Giroux | ................ | E04G 21/3214 |
| 2019/0240859 A1 * | 8/2019 | Huber | ....................... | B25F 5/02 |
| 2021/0107130 A1 * | 4/2021 | Yoshikane | ............... | B25H 3/00 |
| 2022/0203514 A1 * | 6/2022 | Dennis | ..................... | B25F 5/02 |

FOREIGN PATENT DOCUMENTS

| | | |
|---|---|---|
| CN | 102029603 A | 4/2011 |
| DE | 10 2004 032 788 A1 | 2/2006 |
| EP | 1 862 264 A1 | 12/2007 |
| EP | 2 022 607 A2 | 2/2009 |
| EP | 2 116 335 A1 | 11/2009 |
| EP | 2 311 310 A1 | 4/2011 |
| EP | 2 370 238 B1 | 10/2011 |
| EP | 2 383 084 A1 | 11/2011 |
| WO | WO 2009/142334 A1 | 11/2009 |
| WO | WO 2010/115438 A1 | 10/2010 |
| WO | WO-2017119527 A1 * | 7/2017 ................ F16B 2/22 |

OTHER PUBLICATIONS

Chinese-language Office Action issued in Chinese Application No. 201910108491.4 dated Nov. 1, 2021 (16 pages).

* cited by examiner

GARDENING AND/OR FORESTRY APPARATUS

CROSS REFERENCE TO RELATED APPLICATION

This application claims priority under 35 U.S.C. § 119 from European Patent Application No. 18155346.2, filed Feb. 6, 2018, the entire disclosure of which is herein expressly incorporated by reference.

BACKGROUND AND SUMMARY OF THE INVENTION

The invention relates to a gardening and/or forestry apparatus.

Gardening and/or forestry apparatuses are known.

The invention is based on the problem of providing a gardening and/or forestry apparatus which has improved properties and is therefore more user-friendly.

The invention solves the problem by providing a gardening and/or forestry apparatus having a support element supporting an eyelet which is configured to incorporate an apparatus securing element, and an element receiving device, wherein the support element and the element receiving device are configured to receive the support element in the element receiving device either in a first rotational position or in a second rotational position differing from the first rotational position and to secure the support element against rotation by form-fitting to the element receiving device. Advantageous developments and/or configurations of the invention are further described and claimed herein.

The gardening and/or forestry apparatus according to the invention comprises a support element. The support element supports an eyelet. The eyelet is configured to incorporate, in particular to fasten, an apparatus securing element. The gardening and/or forestry apparatus also comprises an element receiving device. The support element and the element receiving device are configured to receive the support element in the element receiving device either in a first rotational position or in a second rotational position differing from the first rotational position and to secure the support element against rotation by form-fitting to the element receiving device.

The gardening and/or forestry apparatus and/or the different rotational positions of the support element provide for different orientations of the eyelet. In particular, the form fit provides for a straightforward and, at the same time, reliable, in particular secure, orientation of the eyelet. It is thus possible for a gardener and/or forestry worker, in particular a tree climber, to connect the gardening and/or forestry apparatus and the apparatus securing element to one another with any desired orientation of said apparatus and element in relation to one another. In particular, the gardener and/or forestry worker can select the rotational position of the support element, and therefore the orientation of the eyelet, such that he can work with the gardening and/or forestry apparatus as far as possible without being impeded and/or disrupted by the apparatus securing element. The gardening and/or forestry apparatus is therefore user-friendly.

In particular, the gardening and/or forestry apparatus can be configured in the form of a user-actuable and/or handheld gardening and/or forestry apparatus. Hand-held gardening and/or forestry apparatus can mean that the gardening and/or forestry apparatus can have a maximum mass of 50 kilograms (kg), in particular of 20 kg, in particular of 10 kg.

The support element can be configured in the form of a support plate.

The eyelet can have, or be, a retaining eyelet, a mounting eyelet or eye, a ring, a bracket or a loop or sling. In particular, the eyelet can be of closed configuration. It is also possible for a diameter, in particular an average diameter, of the eyelet to range from 1 centimeter (cm) to 10 cm, in particular from 2 cm to 5 cm. Moreover, it is possible for the eyelet to consist to some extent, or even in its entirety, of metal.

The eyelet can differ from the support element. It is also possible for the eyelet to be connected to the support element, in particular to a peripheral region of the support element, and in particular to be fastened on the support element. In particular, the eyelet can be rotationally fixed in relation to the support element at least about a normal or a vertical to a plane defined by the support element.

The apparatus securing element can be a strap, a rope, a band, a cord, a securing ring, a carabiner or an item of climbing gear, in particular of a climbing harness.

The second rotational position can differ from the first rotational position by a rotation of the support element about the normal to the plane defined by the support element or the element receiving device and/or about a longitudinal axis of the gardening and/or forestry apparatus. In particular, the support element can be transferred from the first rotational position to the second rotational position by rotation, in particular only by rotation. In addition, or as an alternative, it is possible for the apparatus securing element to be capable of incorporation in the first rotational position and in the second rotational position of the support element and/or for the eyelet and/or the support element to be configured for incorporation of the apparatus securing element in the first rotational position and in the second rotational position of the support element.

Received in the element receiving device can mean that there can be direct contact with the element receiving device.

The support element can be secured against rotation only, or exclusively, by form-fitting to the element receiving device. In other words: the support element need not be secured against rotation by a force-fit and/or a material bond with the element receiving device. In particular, it is possible for the form fit with the element receiving device to block, or prevent, transfer, in particular undesirable transfer, of the support element from the first rotational position into the second rotational position and/or from the second rotational position into the first rotational position. Put another way: the form fit can be established by interengagement between the support element and the element receiving device. In other words: for the form fit, the element receiving device can be, or stand, in the path of the support element.

A basic shape of the element receiving device and/or a basic shape of the support element can define the different rotational positions. It is also possible for a shape, in particular an outer shape, of the support element to correspond to a shape, in particular an inner shape, of the element receiving device, in particular to complement the same.

In particular, it is possible to provide more than two different rotational positions, in particular three different rotational positions, in particular four different rotational positions or more than four different rotational positions.

In a development of the invention, the first rotational position and the second rotational position differ by an angle of rotation of at least 45 degrees)(°. In particular, the angle of rotation can be at least 60°, at least 90°, in particular 90°, at least 135° or 180°.

In a development of the invention, a basic shape of the element receiving device and/or of the support element presents rotational symmetry and/or point symmetry and/or axial symmetry. In particular rotational symmetry about the normal to the plane defined by the support element and/or the element receiving device and/or point symmetry in relation to a point, in particular a center point, of the support element and/or of the element receiving device and/or axial symmetry in relation to at least one axis in the plane. The basic shape can comprise, or be, a rectangle, in particular a square.

In a development of the invention, the support element and the element receiving device are configured for connection, in particular to one another, by a form fit, in particular the same form fit. This provides for a straightforward and, at the same time, reliable connection. In particular, the form fit can have a double function, namely securing against rotation and also a connecting function. In other words: the support element need not be connected to the element receiving device by a force fit and/or a material bond.

In a development of the invention, the element receiving device has a groove, in particular an encircling groove. The groove is configured to receive the support element. In other words: the support element can be configured for insertion into the groove. In particular, the groove can be in the path of the support element.

The gardening and/or forestry apparatus can comprise an apparatus housing. The apparatus housing can comprise the element receiving device. In addition, the gardening and/or forestry apparatus can comprise a support securing element, wherein the support securing element can be configured to secure the support element, in particular axially, in the element receiving device against release from the element receiving device, in particular along the normal and/or the longitudinal axis. In particular, the support securing element can be configured for fastening on the apparatus housing and/or the element receiving device in a releasable manner, in particular such that it can be released non-destructively. It is also possible for the support element to be secured against release from the element receiving device by at least one form fit with the element receiving device and/or the support securing element, in particular with the latter in the fastened state.

In addition, or as an alternative, the gardening and/or forestry apparatus can comprise an apparatus housing and an element receiving part which includes the element receiving device, said element receiving part being different from the apparatus housing. In addition, the apparatus housing can comprise a support securing element, wherein the support securing element can be configured to secure the support element, in particular axially, in the element receiving device against release from the element receiving device, in particular along the normal and/or the longitudinal axis. In particular, the element receiving part can be configured for fastening on the apparatus housing and/or the support securing element in a releasable manner, in particular such that it can be released non-destructively. It is also possible for the support element to be secured against release from the element receiving device by at least one form fit with the element receiving part, in particular with the latter in the fastened state, or the element receiving device and/or the apparatus housing and/or the support securing element.

In a development of the invention, the gardening and/or forestry apparatus comprises an apparatus housing having a first housing part and a second housing part. The element receiving device includes a first receiving device on the first housing part and a second receiving device on the second housing part. The first housing part and the second housing part are configured to be variable, in particular in a non-destructive manner, between a closed condition and an opened condition. In the closed condition, the support element is received in the first receiving device and the second receiving device and is secured against rotation by the form-fitting to the first receiving device and the second receiving device. In the opened condition, the first receiving device or the second receiving device are not form-fitting to the support element for rotation of the support element.

The opened condition makes it possible to free the support element for rotation. In particular, the opened condition can make it possible for the support element to be straightforwardly removed from, or pushed out of, the receiving device, in particular the first or the second receiving device, or for the support element, in particular in the desired rotational position, to be straightforwardly inserted or pushed into the receiving device, in particular into the first or the second receiving device. The second rotational position can differ from the first rotational position by a rotation of the support element about a longitudinal axis of the apparatus housing.

In addition, the opened condition can allow access to an interior, in particular a closed interior, of the gardening and/or forestry apparatus, or of the apparatus housing thereof, in order for the gardening and/or forestry apparatus to be maintained or repaired. In particular, the gardening and/or forestry apparatus can have a drive motor, wherein the drive motor can be arranged to some extent, or even in its entirety, within the apparatus housing. The drive motor can be an, in particular battery-fed, electric motor or a combustion engine.

In particular, in the closed condition, the support element cannot be removed from the receiving device or inserted into the receiving device. It is also possible for the first housing part and/or the second housing part to be in the path of the support element.

The second housing part can differ from the first housing part. The apparatus housing can be referred to as a two-part apparatus housing. The second receiving device can differ from the first receiving device. In particular, the first receiving device can have a first groove and/or the second receiving device can have a second groove. The first housing part and the second housing part can be configured to be variable between the closed condition and the opened condition. The opened condition can differ from the closed condition.

In order to secure the closed condition against being changed over into the opened condition, the gardening and/or forestry apparatus can have a housing securing device, wherein the housing securing device can be configured to secure the first housing part and the second housing part against opening, in particular by connecting the same. In particular, the housing securing device can comprise, or be, a screw connector. The housing securing device can be configured in a releasable manner, in particular such that it can be released non-destructively, for the purpose of changing over the closed condition into the opened condition.

In a development of the invention, the gardening and/or forestry apparatus comprises a tool. The tool is disposed on a tool side of the gardening and/or forestry apparatus and/or extends from and/or to the tool side. The element receiving device is disposed on a receiving side of the gardening and/or forestry apparatus opposed to the tool side. This makes it possible to reduce, or even to prevent, the risk of the tool being impeded and/or disrupted by the apparatus securing element. In particular, the tool side can be a side of the gardening and/or forestry apparatus on which an object, in particular a tree, is worked on by the gardening and/or forestry apparatus, in particular a front side. It is possible for the tool to be fastened in or within the apparatus housing, if present, and to extend outwards from there to the tool side. It is possible for the receiving side to be directed away from the tool side and/or to be at a distance, in particular a maximum distance, from the tool side, and in particular to be a rear side.

In a development of the invention, the gardening and/or forestry apparatus is a saw, in particular a chainsaw, shears, in particular pruning shears, and/or a cutter, in particular a branch lopper. In particular, the gardening and/or forestry apparatus can have a drive motor. The drive motor can be an, in particular battery-fed, electric motor or a combustion engine.

In a development of the invention, the support element and the eyelet are configured for displacing the eyelet, in particular in a non-destructive manner, between an incorporating position and a stowing position. In the incorporating position, the eyelet projects from the support element for incorporating the apparatus securing element. In the stowing position, the eyelet abuts on the support element. The incorporating position allows the apparatus securing element to be incorporated easily. The stowing position makes it possible to reduce, or even to prevent, impediment and/or disruption by the eyelet, in particular when the eyelet is not needed. In other words: in the stowing position, the eyelet can be packed away, in particular in a space-saving manner. In particular, it is possible for the eyelet to be closer to the support element in the stowing position than in the incorporating position. The support element and/or the eyelet can have an articulation, in particular a pivot joint, wherein the articulation can connect the eyelet to the support element, in particular can fasten the eyelet on the support element, and/or can be configured to displace, in particular to pivot, the eyelet between the incorporating position and the stowing position. In addition, or as an alternative, it is possible for the apparatus securing element to be capable of being incorporated in the eyelet in the incorporating position in the first rotational position and in the second rotational position of the support element and/or for the eyelet in the incorporating position and/or the support element to be configured for incorporation of the apparatus securing element in the first rotational position and in the second rotational position of the support element. Also in addition, or as an alternative, it is possible for the incorporating position and the stowing position of the eyelet to differ from, or be independent of, the first rotational position and the second rotational position of the support element.

In one configuration of the invention, the support element includes a locking member. The locking member is configured to fix the eyelet in the incorporating position. This makes it possible to reduce, or even to prevent, the risk of undesirable, or unintended, displacement of the eyelet from the incorporating position into the stowing position. In particular, the locking member can be configured to brace, or to deform, the eyelet in the incorporating position such that the eyelet can be fixed in the incorporating position. It is also possible for the locking member to be configured so that, when a limit force is reached or exceeded, displacement of the eyelet from the incorporating position into the stowing position and/or from the stowing position into the incorporating position is freed. The limit force can be at least 1 Newton, in particular at least 5 Newtons.

In one configuration of the invention, the support element includes a handle shell. The handle shell surrounds the eyelet in the stowing position at least partially, in particular fully. This makes it possible for the gardener and/or forestry worker to grip the eyelet easily, in particular when the eyelet has been displaced into the stowing position, in particular for the purpose of displacing the same into the incorporating position. In particular, the handle shell can be semicircular and/or ribbed.

Further advantages and aspects of the invention can be gathered from the claims and from the following description of preferred exemplary embodiments of the invention, which will be explained hereinbelow with reference to the figures.

DETAILED DESCRIPTION OF THE DRAWINGS

Figure 1:
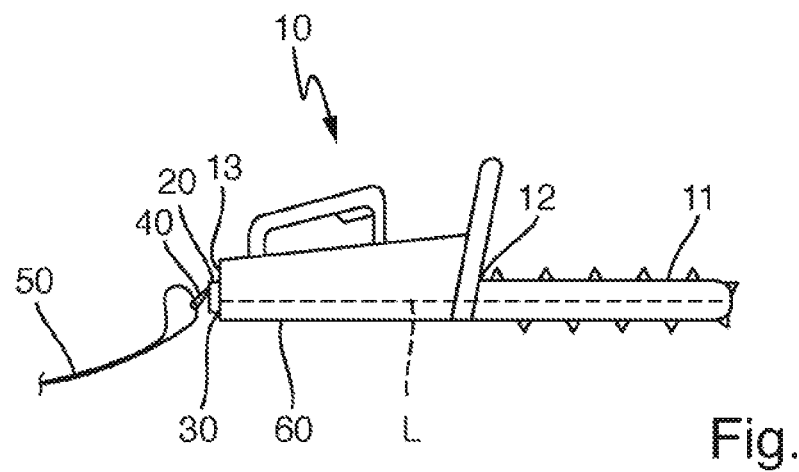
FIG. 1 shows a schematic side view of a gardening and/or forestry apparatus according to the invention.
Figure 2:
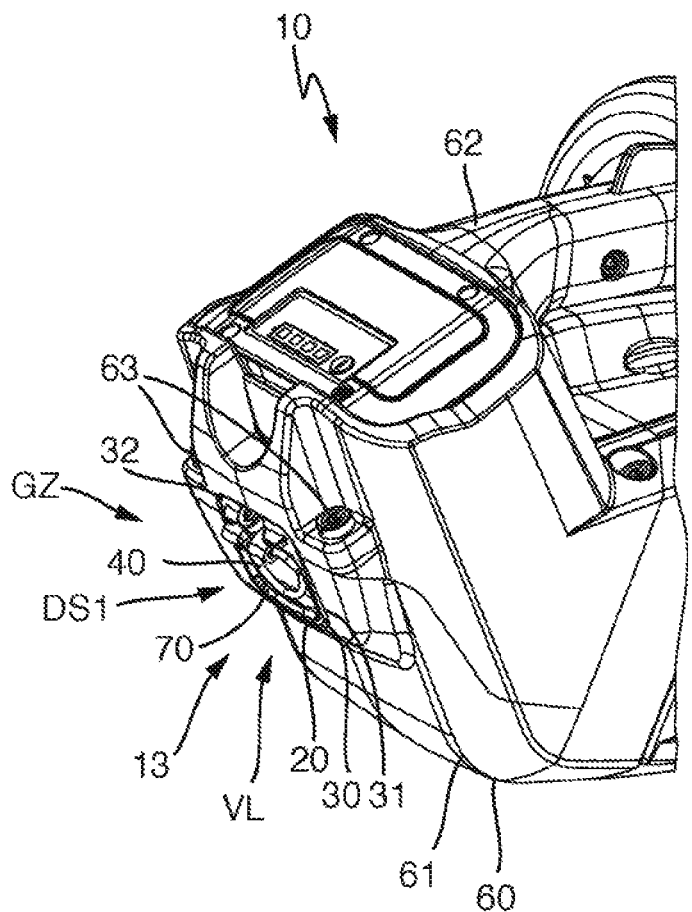
FIG. 2 shows a perspective view of a detail of the gardening and/or forestry apparatus from FIG. 1 with a support element in a first rotational position, with an eyelet in a stowing position.
Figure 3:
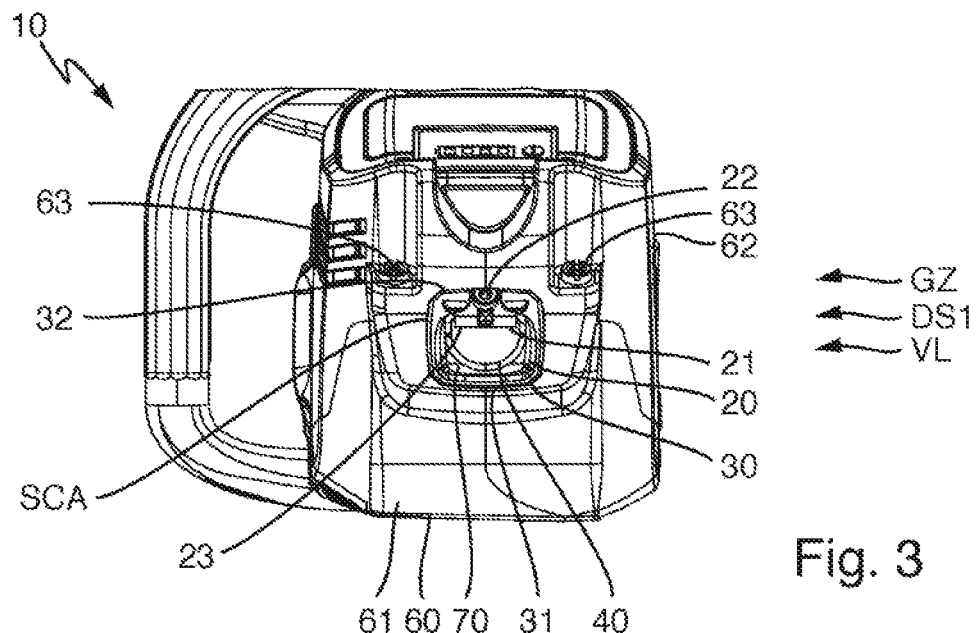
FIG. 3 shows a rear view of the gardening and/or forestry apparatus from FIG. 2.
Figure 4:
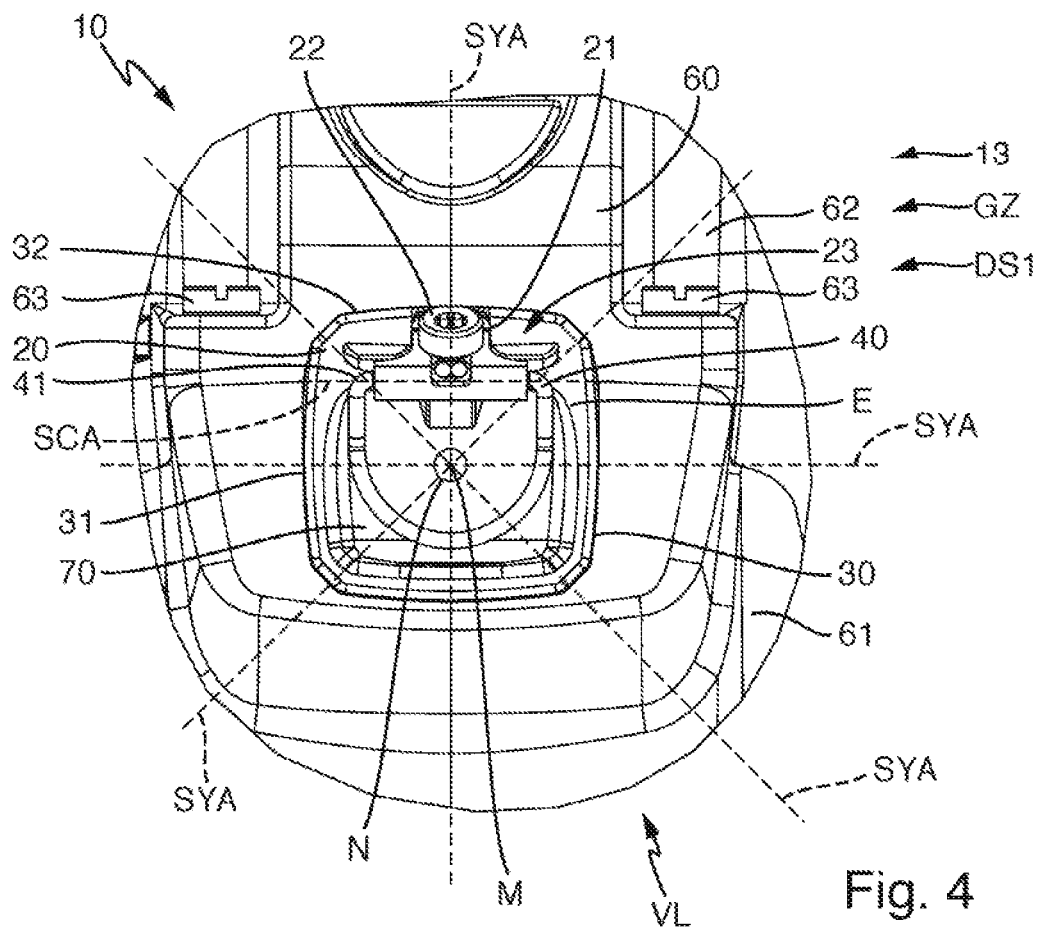
FIG. 4 shows an enlargement of a detail of the gardening and/or forestry apparatus from FIG. 2.
Figure 5:
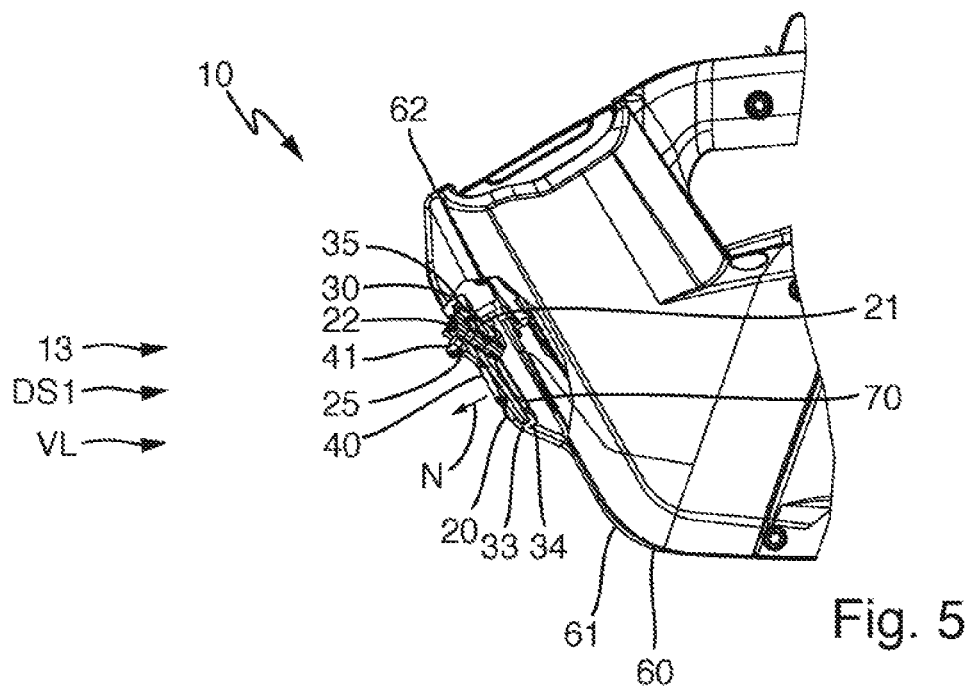
FIG. 5 shows a sectional side view of a detail of the gardening and/or forestry apparatus from FIG. 2.
Figure 6:
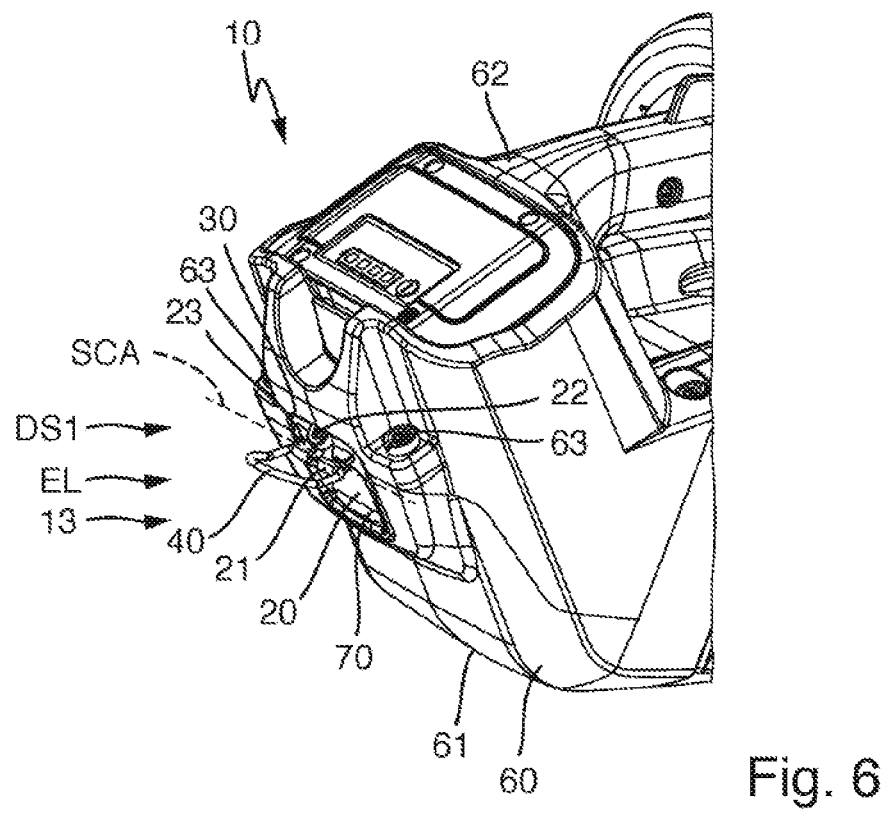
FIG. 6 shows a further perspective view of a detail of the gardening and/or forestry apparatus from FIG. 1, with the eyelet in an incorporating position.
Figure 7:
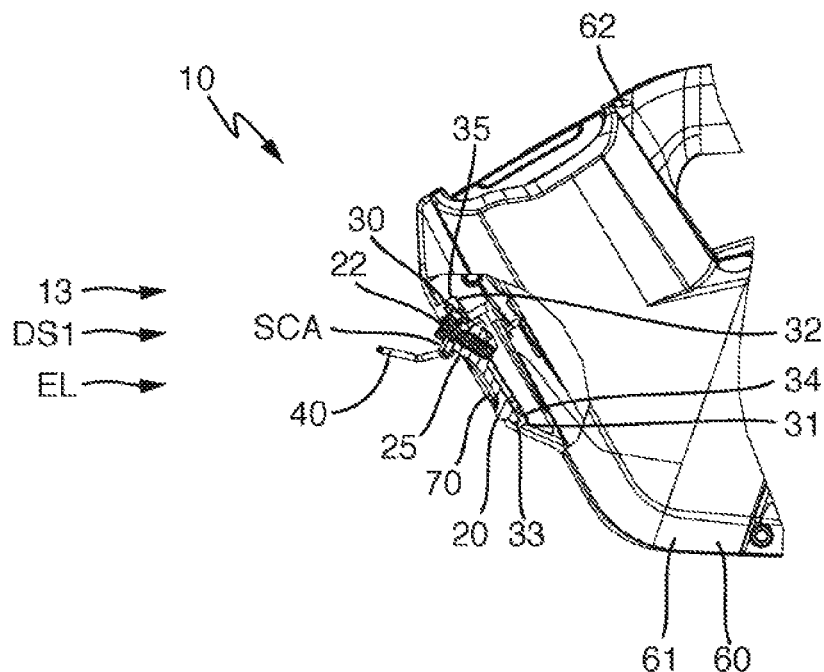
FIG. 7 shows a sectional side view of a detail of the gardening and/or forestry apparatus from FIG. 6.
Figure 8:
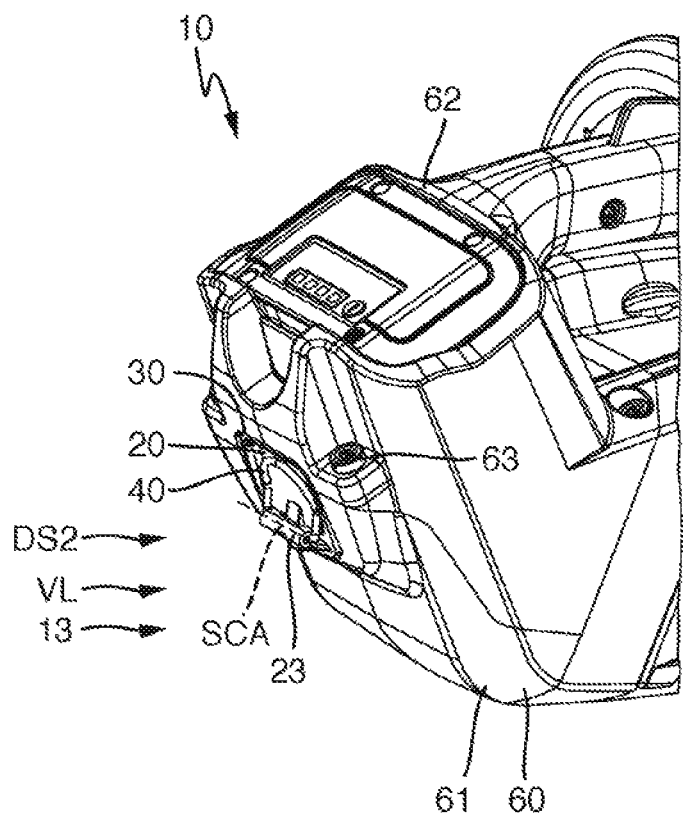
FIG. 8 shows a further perspective view of a detail of the gardening and/or forestry apparatus from FIG. 1, this time with the support element in a second rotational position, with the eyelet in the stowing position.
Figure 9:
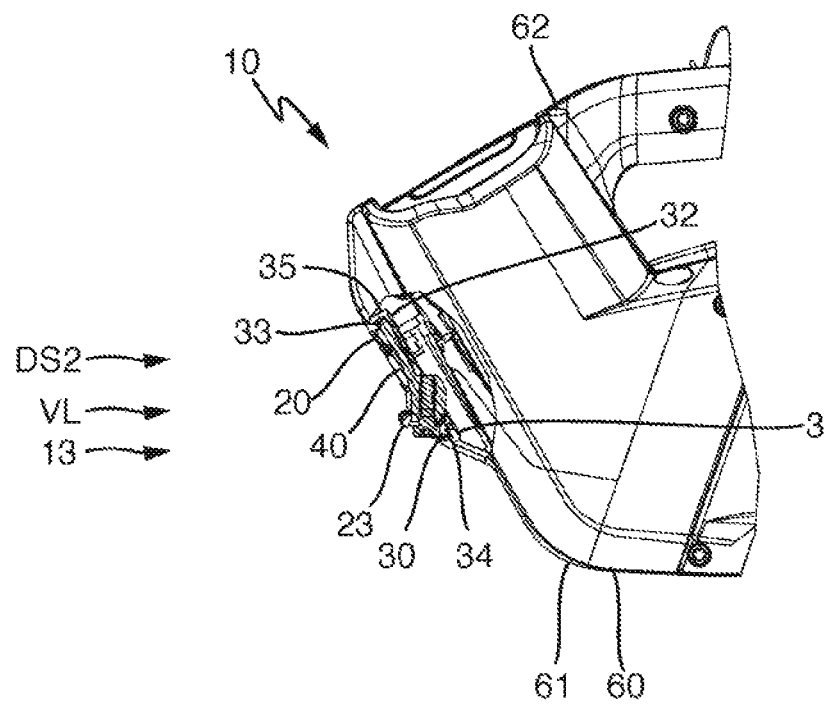
FIG. 9 shows a sectional side view of a detail of the gardening and/or forestry apparatus from FIG. 8.
Figure 10:
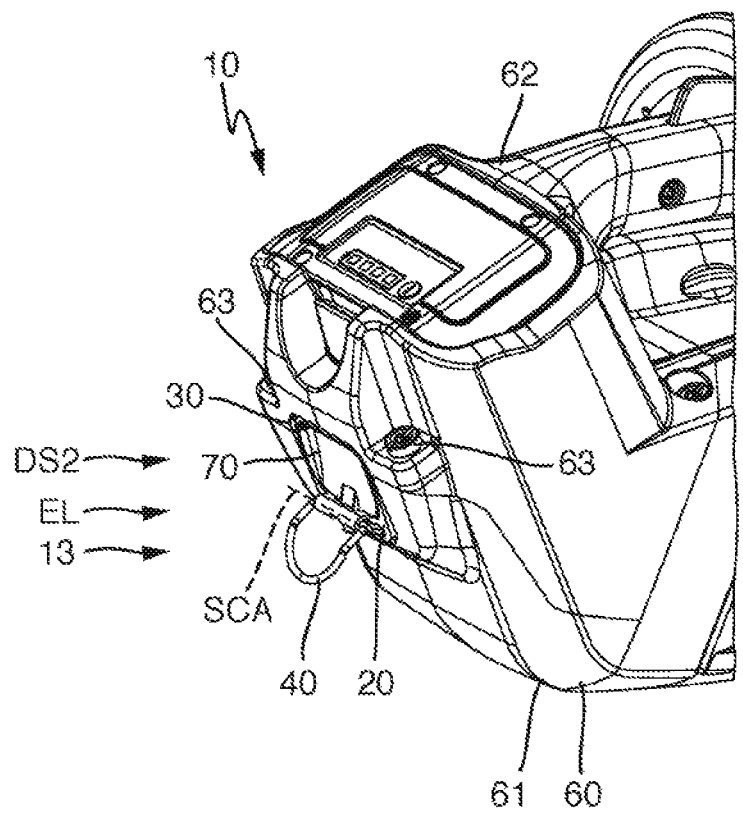
FIG. 10 shows a further perspective view of a detail of the gardening and/or forestry apparatus from FIG. 1, with the support element in the second rotational position, with the eyelet in the incorporating position.
Figure 11:
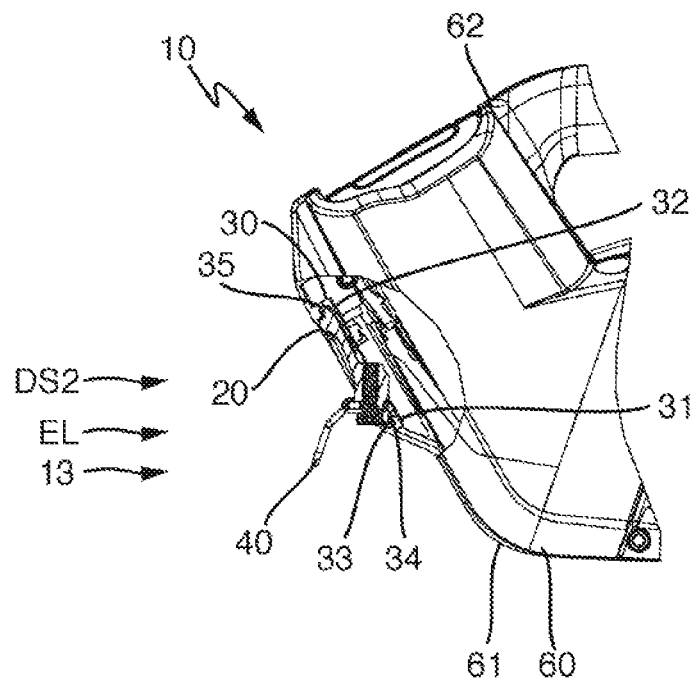
FIG. 11 shows a sectional side view of a detail of the gardening and/or forestry apparatus from FIG. 10.

FIGS. 1 to 15 show a gardening and/or forestry apparatus 10 according to the invention. The gardening and/or forestry apparatus 10 comprises a support element 20. The support element 20 supports an eyelet 40, in particular in the form of a closed ring. The eyelet 40 is configured to incorporate an apparatus securing element 50. The gardening and/or forestry apparatus 10 also comprises an element receiving device 30. The support element 20 and the element receiving device 30 are configured to receive the support element 20 in the element receiving device 30 either in a first rotational position DS1 or in a second rotational position DS2 differing from the first rotational position and to secure the support element 20 against rotation, in particular against rotation into the other rotational position, by form-fitting to the element receiving device 30.

In addition, the support element 20 and the element receiving device 30 are configured for connection to one another by a form fit, in particular the same form fit, in the exemplary embodiment shown they are connected by the form fit.

The gardening and/or forestry apparatus 10 and the different rotational positions DS1, DS2 of the support element 20 provide for different orientations of the eyelet 40.

In the exemplary embodiment shown, the support element 20 and the element receiving device 30 are configured to receive the support element 20 in the element receiving device 30 either in the first rotational position DS1, in the second rotational position DS2, in a third rotational position DS3, or in a fourth rotational position DS4 and to secure the support element 20 against rotation, in particular against rotation into the other rotational positions, by form-fitting to the element receiving device 30. In alternative exemplary embodiments, it is possible to provide just two, three or more than four rotational positions.

Figure 12:
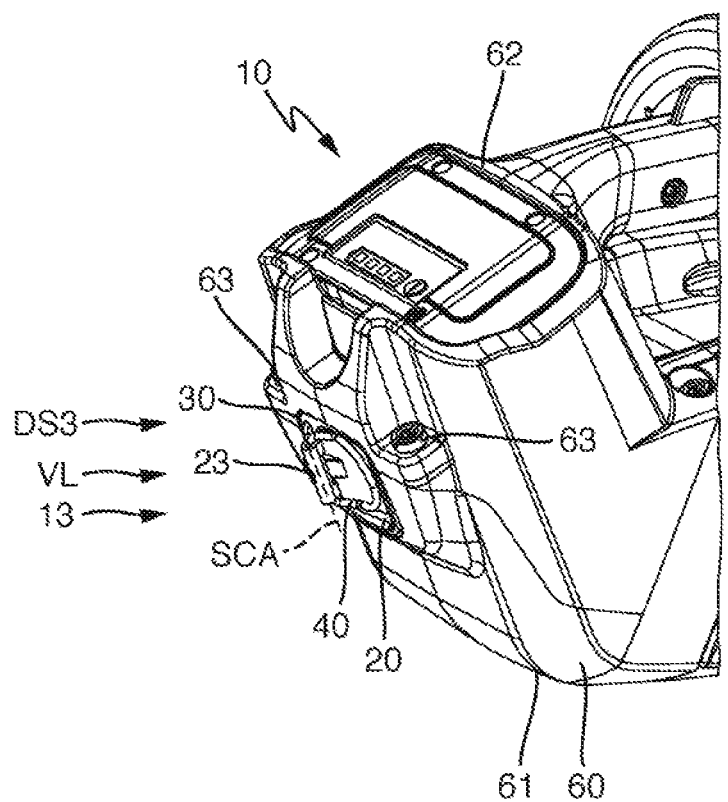
FIG. 12 shows a further perspective view of a detail of the gardening and/or forestry apparatus from FIG. 1, this time with the support element in a third rotational position, with the eyelet in the stowing position.
Figure 13:
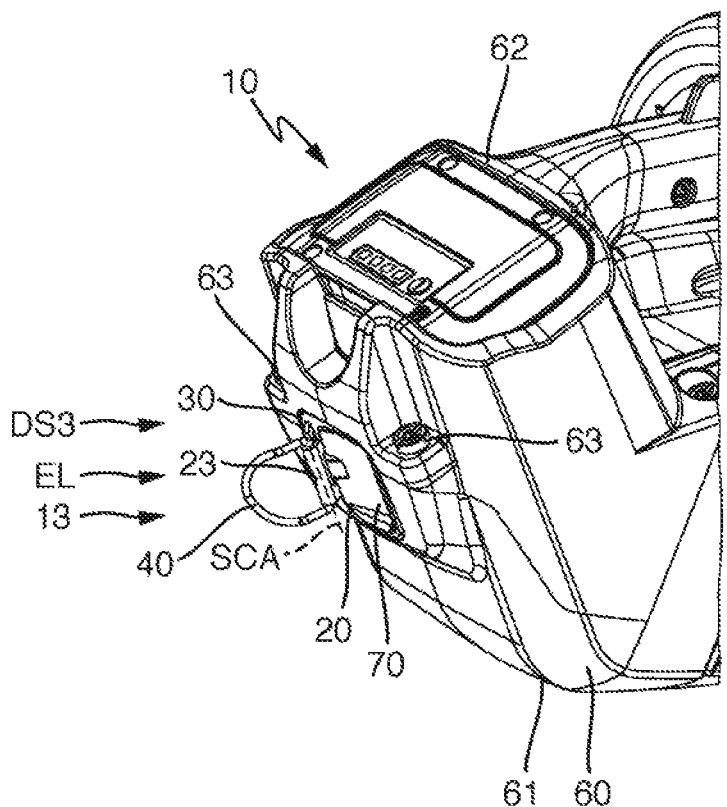
FIG. 13 shows a further perspective view of a detail of the gardening and/or forestry apparatus from FIG. 1 with the support element in the third rotational position, with the eyelet in the incorporating position.
Figure 14:
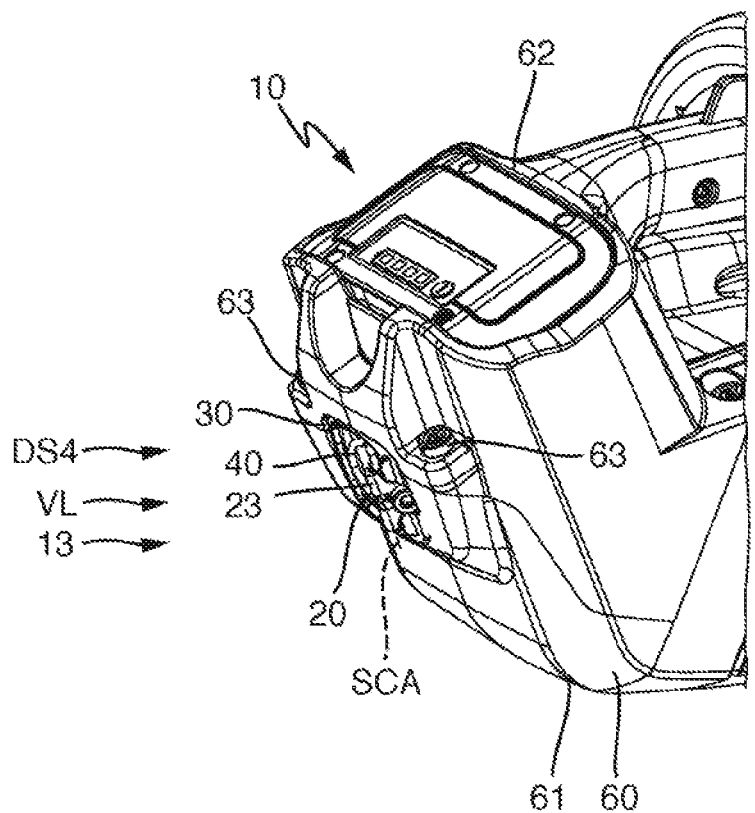
FIG. 14 shows a further perspective view of a detail of the gardening and/or forestry apparatus from FIG. 1, this time with the support element in a fourth rotational position, with the eyelet in the stowing position.
Figure 15:
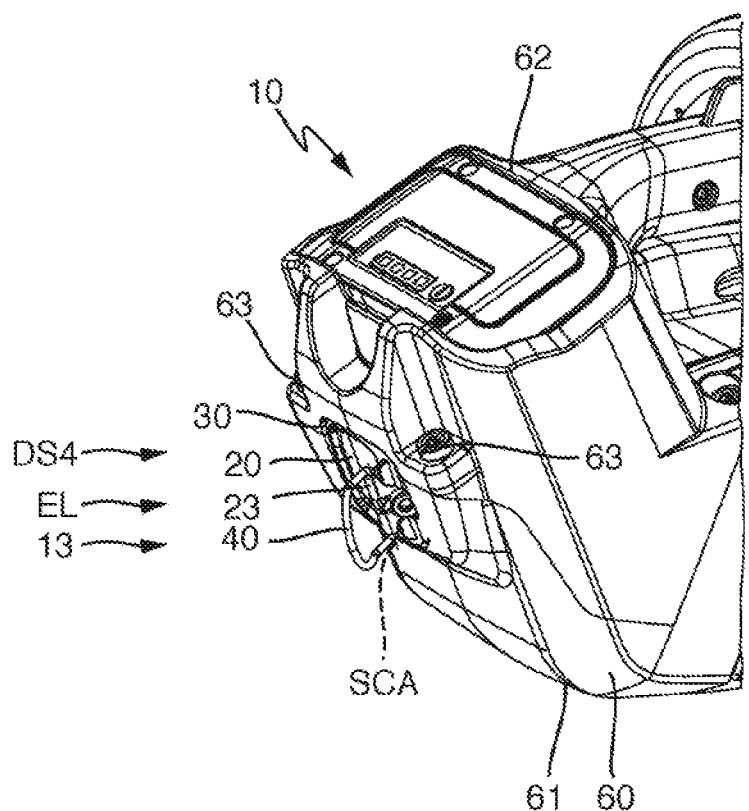
FIG. 15 shows a further perspective view of a detail of the gardening and/or forestry apparatus from FIG. 1 with the support element in the fourth rotational position, with the eyelet in the incorporating position.

FIGS. 1 to 7 show the support element 20 in the first rotational position DS1, in particular with the eyelet 40 oriented upwards. FIGS. 8 to 11 show the support element 20 in the second rotational position DS2, in particular with the eyelet 40 oriented downwards. FIGS. 12 and 13 show the support element 20 in the third rotational position DS3, in particular with the eyelet 40 oriented to the left. FIGS. 14 and 15 show the support element 20 in the fourth rotational position DS4, in particular with the eyelet 40 oriented to the right.

In specific terms, the rotational positions DS1, DS2, DS3, DS4 differ by a rotation, in particular by an angle of rotation, of the support element 20 about a normal N to a plane E defined by the support element 20 or the element receiving device 30 or about a longitudinal axis L of the gardening and/or forestry apparatus 10.

In the exemplary embodiment shown, the first rotational position DS1 and the second rotational position DS2 differ by an angle of rotation of at least 45°, and in particular of 180°. It is also the case that the first rotational position DS1 and the third rotational position DS3 differ by an angle of rotation of 90°, in particular minus 90°. Moreover, the first rotational position DS1 and the fourth rotational position DS4 differ by an angle of rotation of 90°, in particular plus 90°.

In specific terms, a basic shape, in particular an inner shape, of the element receiving device 30 or a basic shape, in particular an outer shape, of the support element 20 defines the different rotational positions.

In the exemplary embodiment shown, the basic shape of the element receiving device 30 and the basic shape of the support element 20 present rotational symmetry, in particular about the normal N. It is also the case that the basic shape of the element receiving device 30 and the basic shape of the support element 20 present point symmetry, in particular about a center point M of the element receiving device 30 and/or of the support element 20. Moreover, the basic shape of the element receiving device 30 and the basic shape of the support element 20 present axial symmetry, in particular in relation to at least one axis of symmetry SYA in the plane E, in particular in relation to four axes of symmetry SYA. In alternative exemplary embodiments, the basic shape of the element receiving device and/or of the support element can present rotational symmetry or point symmetry or axial symmetry. In the exemplary embodiment shown, the basic shape is a square.

In particular, the outer shape of the support element 20 corresponds to the inner shape of the element receiving device 30.

In specific terms, the element receiving device 30 includes a groove 33, in particular an encircling groove. The groove 33 is configured to receive the support element 20. In the exemplary embodiment shown, the support element 20 is received or inserted in the groove 33, in particular in a respective one of the different rotational positions. In particular, the outer shape of the support element 20 corresponds to the inner shape of the groove 33.

It is also the case that the gardening and/or forestry apparatus 10 comprises an apparatus housing 60 having a first housing part 61 and a second housing part 62. The element receiving device 30 includes a first receiving device 31 on the first housing part 61 and a second receiving device 32 on the second housing part 62. The first housing part 61 and the second housing part 62 are configured to be variable between a closed condition GZ and an opened condition. In the closed condition GZ, the support element 20 is received in the first receiving device 31 and the second receiving device 32 and is secured against rotation by the form-fitting to the first receiving device 31 and the second receiving device 32. In the opened condition, the first receiving device 31 or the second receiving device 32 are not form-fitting to the support element 20 for rotation of the support element 20.

In specific terms, in the closed condition GZ, the support element 20 cannot be removed from the element receiving device 30 or inserted into the element receiving device 30. In the opened condition, it is possible for the support element 20 to be removed from the first receiving device 31 or the second receiving device 32 or to be inserted into the first receiving device 31 or into the second receiving device 32, in particular in a respective one of the different rotational positions.

In the exemplary embodiment shown, the gardening and/or forestry apparatus comprises a housing securing device 63, in particular with two housing screws. The housing securing device 63 is configured to secure the first housing part 61 and the second housing part 62, in particular in a releasable manner, against opening, in particular to connect the two. The apparatus housing 60 can be transferred from the closed condition GZ into the opened condition by the housing securing device 63 being released and the apparatus housing 60 being opened, in particular by the first housing part 61 and the second housing part 62 being moved apart from one another.

It is also the case that, in the exemplary embodiment shown, the groove 33 has a first groove portion 34 and a second groove portion 35. The first receiving device 31 has the first groove portion 34. The second receiving device 32 has the second groove portion 35.

Moreover, in the exemplary embodiment shown, the gardening and/or forestry apparatus 10 is a saw, in particular a top handle chainsaw.

The gardening and/or forestry apparatus 10 has a tool 11, in the exemplary embodiment shown a saw chain. The tool 11 is disposed on a tool side 12 of the gardening and/or forestry apparatus 10, or of the apparatus housing 60 thereof. The element receiving device 30 is disposed on a receiving side 13 of the gardening and/or forestry apparatus 10, or of the apparatus housing 60 thereof, opposed to the tool side 12.

In alternative exemplary embodiments, the gardening and/or forestry apparatus can be shears, in particular pruning shears, and/or a cutter, in particular a branch lopper. It is also the case that, in alternative exemplary embodiments, the tool can comprise, or be, at least one or two cutting blades, in particular cutting blades of shears.

In addition, the support element 20 and the eyelet 40 are configured for displacing the eyelet 40 between an incorporating position EL and a stowing position VL. In the incorporating position EL, the eyelet 40 projects from the support element 20 for incorporating the apparatus securing element 50, as shown in FIGS. 1, 6, 7, 10, 11, 13 and 15. In the stowing position VL, the eyelet 40 abuts on the support element 20, as shown in FIGS. 2 to 5, 8, 9, 12 and 14.

In specific terms, the eyelet 40, in particular an eyelet pivoting portion 41, is connected to the support element 20, in particular to a peripheral region of the support element 20. In the exemplary embodiment shown, the gardening and/or forestry apparatus 10 has a clamping element 21 and a screw 22, the latter connecting the eyelet 40 to the support element. The eyelet pivoting portion 41 and the clamping element 21 interact so as to form an articulation, in particular a pivot joint 23. The pivot joint 23 makes it possible to displace, in particular to pivot, the eyelet 40 between the incorporating position EL and the stowing position VL, in particular by way of a pivot angle of at least 90°. In the exemplary embodiment shown, a displacement axis, in particular a pivot axis SCA, is parallel to the plane E.

It is also the case that the support element 20 includes a locking member 25. The locking member 25 is configured to fix the eyelet 40 in the incorporating position EL, in particular by bracing and deforming it.

Moreover, the support element 20 includes a handle shell 70. The handle shell 70 surrounds the eyelet 40 in the stowing position VL at least partially.

Figure 16:
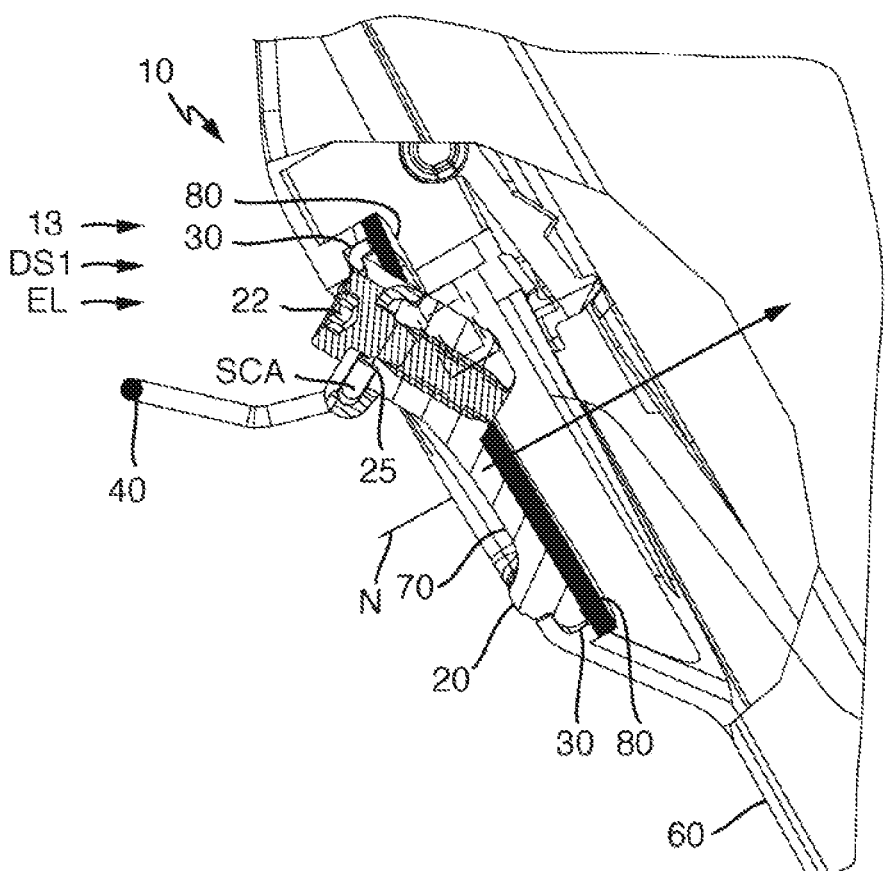
FIG. 16 shows a sectional side view of the gardening and/or forestry apparatus according to the invention.

FIG. 16 shows a further gardening and/or forestry apparatus 10 according to the invention. The gardening and/or forestry apparatus 10 comprises an apparatus housing 60, in particular with division of the housing differing from that in FIGS. 1 to 15, or with no division of the housing as in FIGS. 1 to 15. The apparatus housing 60 comprises the element receiving device 30. In addition, the gardening and/or forestry apparatus 10 comprises a support securing element 80. The support securing element 80 is configured to secure the support element 20, in particular axially, in the element receiving device 30 against release from the element receiving device 30, in particular along the normal N.

In specific terms, the support securing element 80 is configured for fastening on the apparatus housing 60 or the element receiving device 30 in a releasable manner, in particular such that it can be released non-destructively. It is also the case that the support element 20 is secured against release from the element receiving device 30 by at least one form fit with the element receiving device 30 and/or the support securing element 80, in particular with the latter in the fastened state. The support securing element 80 can be released from the apparatus housing 60 or the element receiving device 30. This makes it possible for the support element 20 to be released and removed from, or pushed out of, the element receiving device 30, in particular in the direction of the arrow shown in FIG. 16, and thus to be freed for rotation, or for the support element to be easily inserted or pushed into the element receiving device 30, in particular in the desired rotational position.

As made clear by the exemplary embodiments shown and explained above, the invention provides a gardening and/or forestry apparatus which has improved properties and is therefore more user-friendly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A gardening and/or forestry apparatus, comprising:
a gardening and/or forestry tool,
a housing having a tool side, on which the gardening and/or forestry tool is disposed, and a receiving side,
a support element supporting an eyelet which is configured to incorporate an apparatus securing element, and
an element receiving device disposed on the receiving side of the housing, wherein
the support element and the element receiving device are configured so that the support element is receivable in the element receiving device either in a first rotational position or in a second rotational position differing from the first rotational position, so that the support element is securable against rotation by form-fitting to the element receiving device and so that different orientations of said eyelet are provided for,
the housing has a first housing part and a second housing part,
the element receiving device includes a first receiving device on the first housing part and a second receiving device on the second housing part, and
the first housing part and the second housing part are configured to be variable between a closed condition, in which the support element is received in the first receiving device and the second receiving device and is secured against rotation by form-fitting to the first receiving device and the second receiving device, and an opened condition, in which the support element is not secured against rotation by form-fitting to the first receiving device and the second receiving device.

2. The gardening and/or forestry apparatus according to claim 1, wherein
the first rotational position and the second rotational position differ by an angle of rotation of at least 45°.

3. The gardening and/or forestry apparatus according to claim 1, wherein
a basic shape of the element receiving device and/or of the support element present at least one of: rotational symmetry, point symmetry, or axial symmetry.

4. The gardening and/or forestry apparatus according to claim 1, wherein
the support element and the element receiving device are configured for connection in a form-fitting manner.

5. The gardening and/or forestry apparatus according to claim 1, wherein
the element receiving device includes a groove which is configured to receive the support element.

6. The gardening and/or forestry apparatus according to claim 1, wherein the receiving side of the housing is opposed to the tool side of the housing.

7. The gardening and/or forestry apparatus according to claim 1, wherein
the gardening and/or forestry tool is at least one of: a chain saw, shears, pruning shears, a cutter, or a branch lopper.

8. The gardening and/or forestry apparatus according to claim 1, wherein
the support element and the eyelet are configured for displacing the eyelet between an incorporating position, in which the eyelet projects from the support element for incorporating the apparatus securing element, and a stowing position, in which the eyelet abuts on the support element.

9. The gardening and/or forestry apparatus according to claim 8, wherein
the support element includes a locking member which is configured to fix the eyelet in the incorporating position.

10. The gardening and/or forestry apparatus according to claim 8,
wherein the support element includes a handle shell which surrounds the eyelet in the stowing position at least partially.

11. The gardening and/or forestry apparatus according to claim 1, wherein
the element receiving side of the housing is opposed to the tool side of the housing, and
wherein the gardening and/or forestry tool is at least one of: a chain saw, shears, pruning shears, a cutter, or a branch lopper.

* * * * *